Figure 1:
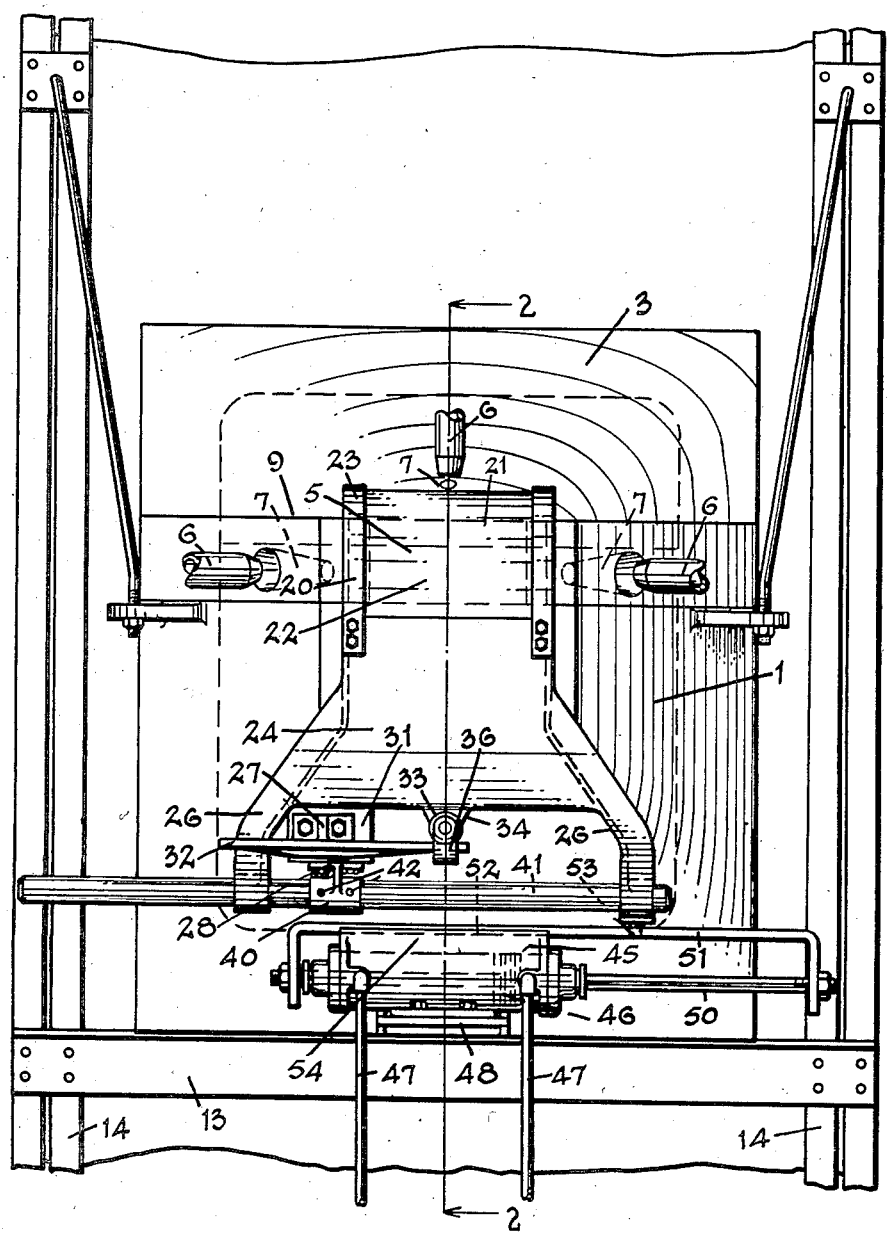

Jan. 28, 1936.  A. F. TREMBLAY  2,028,960
GLASS FEEDING SHELF
Filed Aug. 23, 1934  2 Sheets-Sheet 1

Inventor
Albert F. Tremblay
By
Attorney

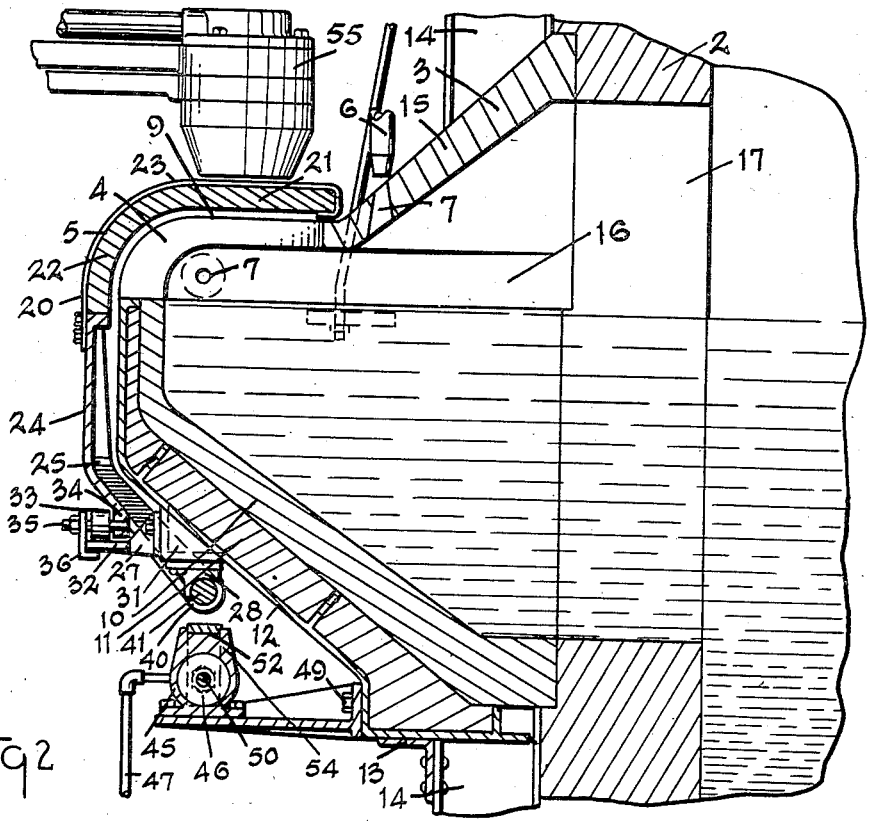
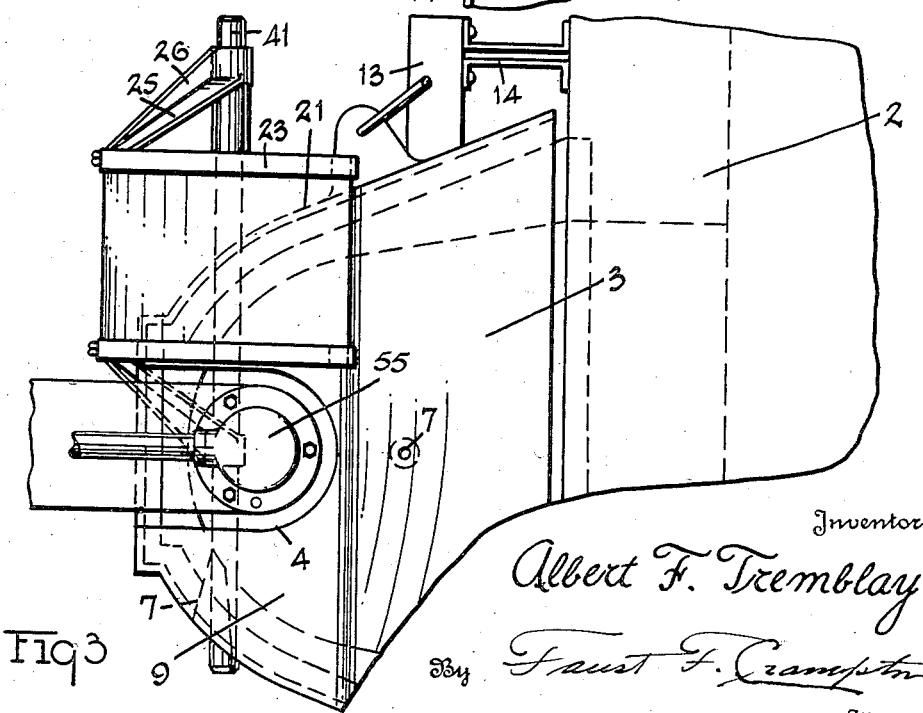

Patented Jan. 28, 1936

2,028,960

UNITED STATES PATENT OFFICE 2,028,960

GLASS FEEDING SHELF

Albert F. Tremblay, Union City, Ind.

Application August 23, 1934, Serial No. 741,055

3 Claims. (Cl. 49—56)

My invention has for its object to provide a glass feeding shelf for feeding glass to glass forming machines of the intermittently moving type having glass drawing molds that are charged by dipping into a pool of hot glass within the shelf. The shelf may be advantageously used in connection with gob forming devices such as are described in my application Serial Number 603,475 filed April 6, 1932 for Glass feeding process and apparatus, wherein the glass is drawn into the gob shaping mold by suction. The invention particularly has for its object to provide means for maintaining the glass in the shelf at a uniform, high temperature and in this connection to cause reheating of glass sheared from the mold as it is withdrawn and to reheat the chilled surface glass in the pool that is exposed to atmospheric temperature during the charging of the molds, as well as to reheat that portion of the glass that comes in contact with the mold as it is inserted into the pool. Thus, upon each drawing operation, glass of the same temperature will be withdrawn from the pool.

The invention also has for its object to provide a shelf wherein the opening area into the pool is reduced to a minimum to reduce the exposure of the surface of the glass in the shelf to the outside temperature to a minimum and thus reduce the heat loss normally caused in the glass withdrawing operations to a minimum.

The invention further provides an automatic means for alternately closing and opening the shelf above the point at which the gathering mold is dipped into the glass, the opening into the shelf being closed during the movement of the glass molds to and from the points of entrance into the opening of the shelf, during which the chilled glass has opportunity to rise to the temperature of the body of the glass in the furnace.

The invention consists in other features and advantages which will appear from the following description and upon examination of the drawings. Structures containing the invention may partake of different forms and may be varied in their details and still embody the invention. To illustrate a practical application of the invention, I have selected a glass feeding shelf embodying the invention as an example of the various structures and the details of such structures that contain the invention and shall describe the selected glass shelf hereinafter, it being understood that certain features of my invention may be used to advantage without a corresponding use of other features of the invention and without departing from the spirit of the invention as presented in the claims. The particular structure selected is shown in the accompanying drawings.

Fig. 1 illustrates a front view of the shelf. Fig. 2 is a view of a section taken on the plane of the line 2—2 indicated in Fig. 1, the gathering mold being shown in position for descent into the shelf just in advance of the opening of the shelf. Fig. 3 is a top view of the shelf, the cover being shown open.

The shelf 1 communicates with the body of the tank 2 to receive and maintain a large part of the heated glass within the shelf, the glass level being slightly below the level of the lip of the shelf. In the form of construction shown, the glass shelf is covered with a cowl part 3 and a horizontally extending part 9 having an outer edge portion curved downward to support the top of the shelf on the edge of the shelf. The horizontally extending part is provided with an opening 4 that may be covered by a cover plate 5 that is preferably bent to conform with the outer end of the top of the shelf.

The cover 5 is slidably supported for opening and closing the shelf. The shelf is provided with suitable burners for maintaining the glass in the shelf at the desired temperature. In the form of construction, the burners 6 may be located in registering relation with respect to the openings 7 formed in the top of the shelf and so as to direct the flames against and over the surface of the glass in the shelf. The cowl-covered portion thus forms a conditioning chamber which enables heat control individual to the shelf and the glass from which the glass is withdrawn. Thus, due to the complete closing of the opening and consequently due to the complete enclosure of the shelf by the top and cover, the shelf may be extended a considerable distance from the tank body to correspondingly increase the volume of glass in the shelf to enable complete control of the temperature of the glass drawn from the shelf by suitably adjusted burners that heat the glass in the shelf.

Thus, the temperature of the glass in one or more shelves from which glass for small ware may be withdrawn, may be maintained at a relatively high temperature, and the glass in other of the shelves may be maintained at a relatively lower temperature for the withdrawal of glass to produce heavier ware, at the same time.

The bottom of the shelf is provided with suitable refractory blocks 10 and 11 of the type well known that are supported in position by a suitable casting 12 which is in turn supported by the angle iron 13 secured to the buck stays 14. The top block 15 rests upon the edge of the shelf and fits into the blocks of the body of the tank 2. It is shaped to form the cowl 3 that forms the top of the conditioning chamber 16 that communicates with the body of the tank through the opening 17. The part of the block 15 having the opening 4 is located in close proximity to the top surface of the glass, thus enabling dipping of the gathering molds into the glass by relatively short vertical movements.

The cover 5 is formed of a refractory material and is supported by means of a metal frame 20. The cover 5 has a horizontally disposed portion 21 conforming to the horizontally disposed part of the outer end of the top of the shelf and a curved portion 22 that also conforms to the end portion of the top of the shelf. The frame 20 is provided with a pair of channeled arms 23 that surround edge portions of the cover 21 and are connected to the plate 24. The plate 24 is provided with the reinforcing ridges 25. Side portions of the plate 24 and the ridges 25 protrude downwardly and form the arms 26 that extend in the form of a Y. The cover and its frame are supported for sliding movements by means of a pair of brackets 27 and 28 located on the under sloping surface of the shelf.

The under side of the shelf is provided with a boss 31 of a relatively short length that protrudes from the supporting plate 12 and has surfaces that extend at right angles to each other. The brackets 27 and 28 are secured by studs to the protruding part of the plate 12. The bracket 27 extends laterally and the bracket 28 extends downwardly from the supporting plate 12. The bracket 27 has a track 32. A roller 33 is connected to a lug 34 that depends from the central part of the frame plate 24 by means of a pin 35 on which the roller 33 freely rotates.

A finger 36 may be secured to the pin 35 and bent so as to engage the under surface of the track 32. The bracket 28 is provided with a sleeve part 40 in which a rod 41 is located and keyed thereto by means of a suitable key bolt or pin 42. The rod 41 extends through a bearing part formed in the ends of the arms 26 and affords a slidable support for the cover 5. Thus, the cover is slidably supported with reference to the shelf and particularly with reference to the opening 4 and is sustained in its relative position with reference to the shelf by the track 32, roller 33, and the rod 41.

The cover may be quickly moved back and forth to open and close the opening 4 in the top part of the shelf by means of a cylinder 45 and a piston 46 that may be pneumatically or hydraulically operated by fluid pressure connected to the cylinder from a suitable source of fluid pressure by means of the pipes 47 to produce the desired reciprocatory movements of the piston 46. The fluid is forced into the cylinder by one or the other of the pipes 47 and exhausted through the other to operate the piston in the manner well known in the art. The piston 46 is connected to the piston rod 50. The cylinder 45 is supported on a bracket 48 that is connected to the plate 12 by means of suitable studs 49.

The ends of the piston rod 50 are connected to a slide rod 51 that moves in a way 52 formed in an extended ridge 54 that protrudes from the body of the cylinder 45. The ends of the slide rod depend downwardly and are connected to the ends of the piston rod 50. The slide rod 51 is connected to one of the arms 26 by means of a suitable stud or pin 53 and consequently the cover 5 is slidably moved to and from the shelf closing position by the operation of the piston. The cylinder 45 is supported on a bracket 48 that is connected to the plate 12 by means of suitable studs 49.

The movement of the piston may be timed to operate simultaneously with the gathering molds by a control valve operated by a glass gathering machine having a plurality of gathering molds, such as the mold 55. The piston operates to open the shelf as the mold descends or approaches the point of descent. The gathering molds enter the opening 4 and dip into the pool of glass in succession. As the mold is withdrawn, the clinging glass is sheared from the lower end of the mold, the sheared glass falling back into the pool. Immediately the movement of the piston is reversed to close the cover when the mold has raised sufficiently to clear the cover.

During the closure periods the temperature of the glass in the shelf is restored to uniformity, all portions thereof chilled by the opening of the shelf and contact with the mold being raised to the temperature of the body of the glass in the shelf by the burners 6. The burners are adjusted to produce a definite temperature. Thus, whether small or large ware is formed by the glass drawn from the shelf, the glass drawn in each succeeding withdrawal will have the same characteristic temperature.

I claim:

1. A glass shelf for glass gathering machines having glass gathering molds, a tank, a shelf part protruding from the tank, a top part having an opening, a cover located in proximity to and above the top for closing the said opening by sliding movements, a piston and cylinder located beneath the shelf, means for connecting a source of air pressure supply with the cylinder, a plate slidably operated by the piston and connected to the cover at its edge and depending therefrom and extending along the under surface of the shelf, a rod for slidably supporting the plate and cover and located beneath the shelf, a bracket for supporting the said rod and located on the surface of the shelf.

2. A glass shelf for glass gathering machines having glass gathering molds, a tank, a shelf part protruding from the tank, a top covering the shelf, the top having a horizontally extending part located in close proximity to the edge of the shelf and a curved edge portion extending to the edge of the shelf and an opening formed in the said horizontally extending part and the said curved edge portion, a cover having a horizontally extending part and a depending curved end edge portion conforming to the horizontally extending part and the curved edge portion of the top for closing the opening in the top, a plate connected to the depending edge portion of the cover and extending to beneath the shelf, the plate having ears, a rod extending through the said ears, a bracket for supporting the said rod located on the under surface of the shelf, a piston and cylinder located beneath the said shelf, the piston connected to the said plate and operative to shift the said plate along the rod and the cover to close the opening.

3. A glass shelf for glass gathering machines having glass gathering molds, a tank, a shelf part protruding from the tank, a top covering the shelf, the top having a horizontally extending part located in close proximity to the edge of the shelf and a curved edge portion extending to the edge of the shelf and an opening formed in the said horizontally extending part and the said curved edge portion, a cover having a horizontally extending part and a depending curved end edge portion conforming to the horizontally extending part and the curved portion of the top for closing the opening in the top, a plate connected to the depending edge portion of the cover end extending to beneath the shelf, the plate having ears, a rod extending through the said ears, a bracket for slidably supporting the said rod located on the under surface of the shelf, a roller connected to the said plate substantially in the vertical plane of the edge of the cover, a track connected to the said bracket for supporting the roller and cooperative with the said rod for supporting the said plate and cover, a piston and cylinder located beneath the said shelf, the piston connected to the said plate and operative to shift the said plate along the rod and the cover to close the opening.

ALBERT F. TREMBLAY.